(12) United States Patent
Mustafiz et al.

(10) Patent No.: US 11,316,758 B2
(45) Date of Patent: Apr. 26, 2022

(54) NETWORK SERVICE DESIGN AND DEPLOYMENT PROCESS FOR NFV SYSTEMS

(71) Applicants: Sadaf Mustafiz, Montreal (CA); Francis Palma, Belleville (CA); Maria Toeroe, Montreal (CA); Ferhat Khendek, Montreal (CA)

(72) Inventors: Sadaf Mustafiz, Montreal (CA); Francis Palma, Belleville (CA); Maria Toeroe, Montreal (CA); Ferhat Khendek, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 135 days.

(21) Appl. No.: 15/569,344

(22) PCT Filed: Aug. 17, 2017

(86) PCT No.: PCT/IB2017/055000
§ 371 (c)(1),
(2) Date: Oct. 25, 2017

(87) PCT Pub. No.: WO2018/033878
PCT Pub. Date: Feb. 22, 2018

(65) Prior Publication Data
US 2018/0309646 A1    Oct. 25, 2018

Related U.S. Application Data

(60) Provisional application No. 62/376,561, filed on Aug. 18, 2016.

(51) Int. Cl.
*H04L 41/5054* (2022.01)
*G06F 9/455* (2018.01)
(Continued)

(52) U.S. Cl.
CPC ...... *H04L 41/5054* (2013.01); *G06F 9/45558* (2013.01); *H04L 41/0886* (2013.01);
(Continued)

(58) Field of Classification Search
CPC combination set(s) only.
See application file for complete search history.

(56) References Cited

U.S. PATENT DOCUMENTS

2015/0180730 A1* 6/2015 Felstaine ............. H04W 12/084
709/225
2016/0043944 A1 2/2016 Felstaine
(Continued)

FOREIGN PATENT DOCUMENTS

JP    2015162843 A      9/2015
JP    2017143452 A  *   8/2017
(Continued)

OTHER PUBLICATIONS

G. Xilouris et al., "T-NOVA: A marketplace for virtualized network functions," 2014 European Conference on Networks and Communications (EuCNC), 2014, pp. 1-5, doi: 10.1109/EuCNC.2014.6882687. (Year: 2014).*

(Continued)

*Primary Examiner* — Uzma Alam
(74) *Attorney, Agent, or Firm* — Julie Dufort; Ericsson Canada Inc.

(57) ABSTRACT

There is described a method for providing a Virtualized Network Function (VNF) according to Network Service (NS) requirements. The method comprises selecting an on-boarded VNF descriptor (VNFD) from a VNF catalogue, configuring parameters of the selected on-boarded VNFD according to the requirements of the NS and instantiating a VNF according to the configured on-boarded VNFD. There is also described a method for providing a Network Service (Continued)

(NS). The method comprises selecting an on-boarded NS Descriptor (NSD) from an NS catalogue, modifying NSD information of the selected on-boarded NSD and instantiating the NS according to the modified on-boarded NSD.

18 Claims, 7 Drawing Sheets

(51) Int. Cl.
  *H04L 41/0893* (2022.01)
  *H04L 41/5041* (2022.01)
  *H04L 41/08* (2022.01)
  *H04L 67/51* (2022.01)

(52) U.S. Cl.
  CPC ...... *H04L 41/0893* (2013.01); *H04L 41/5041* (2013.01); *H04L 67/16* (2013.01); *G06F 2009/45595* (2013.01); *H04L 41/0876* (2013.01)

(56) References Cited

U.S. PATENT DOCUMENTS

| | | | |
|---|---|---|---|
| 2016/0057102 A1* | 2/2016 | Wei | H04L 61/2007 709/226 |
| 2016/0105332 A1* | 4/2016 | Xiang | H04L 41/12 709/226 |
| 2016/0212016 A1* | 7/2016 | Vrzic | H04L 41/12 |
| 2016/0212017 A1* | 7/2016 | Li | H04L 41/5051 |
| 2016/0328259 A1* | 11/2016 | Xia | H04L 41/28 |
| 2017/0006083 A1* | 1/2017 | McDonnell | H04L 67/06 |
| 2018/0307539 A1* | 10/2018 | Celozzi | G06F 11/2035 |
| 2019/0052528 A1* | 2/2019 | Yoshimura | H04L 41/20 |
| 2019/0065234 A1* | 2/2019 | Zembutsu | G06F 9/45558 |
| 2020/0293359 A1* | 9/2020 | Xia | H04L 41/0896 |
| 2022/0052929 A1* | 2/2022 | Priya | H04L 41/5051 |

FOREIGN PATENT DOCUMENTS

| | | | | |
|---|---|---|---|---|
| JP | 2018503319 A | 2/2018 | | |
| WO | WO-2015113278 A1 * | 8/2015 | ......... | H04L 12/4641 |
| WO | 2016/020380 A1 | 2/2016 | | |
| WO | WO-2016020380 A1 * | 2/2016 | ......... | H04L 41/0896 |
| WO | 2016050663 A1 | 4/2016 | | |
| WO | WO-2016095121 A1 * | 6/2016 | | |
| WO | 2016117694 A1 | 7/2016 | | |
| WO | 2016118636 A1 | 7/2016 | | |
| WO | 2016121882 A1 | 8/2016 | | |
| WO | WO-2016183832 A1 * | 11/2016 | ............. | H04L 41/00 |
| WO | WO-2017035737 A1 * | 3/2017 | ......... | H04L 41/0876 |
| WO | WO-2017178068 A1 * | 10/2017 | | |

OTHER PUBLICATIONS

Qadir et al. "Newtork as a Service: the new Vista of Opportunity," Jun. 9, 2016 . Cornell University, pp. 1-7. ARXIV article, https://arxiv.org/pdf/1606.03060v2.pdf (Year: 2016).*
Y. Chen et al.: "Realizing Network Function Virtualization Management and Orchestration with Model Basedii Open Architecture"; IEEE 2015; 9 pages.
ETSI GS NFV-SWA001, V1.1.1 (Dec. 2014); "Network Functions Virtualisation (NFV); Virtual Network Functions Architecture"; Dec. 2014; 93 pages.
R. Mijumbi et al.: "Network Function Virtualization: State-of-the-Art and Research Challenges"; IEEE 2015; 27 pages.
C. Chappell: "NFV MANO: What's Wrong & How to Fix It"; Feb. 2015; 8 pages.
G. Xilouris et al.: "T-NOVA: A Marketplace for Virtualized Network Functions"; IEEE 2014; 5 pages.
ETSI GS NFV 002, V1.1.1 (Oct. 2013): "Network Functions Virtualisation (NFV); Architectural Framework"; Oct. 2013; 21 pages.
ETSI GS NFV-MAN 001, V11.1 (Dec. 2014): "Network Functions Virtualisation (NFV); Management and Orchestration" Dec. 2014; 184 pages.
Oracle Communications Network Service Orchestration Solution; Implementation Guide; Release 1.1; E65331-02; Jul. 2016; 80 pages.
Cisco Elastic Services Controller 2.0 User Guide; first published: Oct. 29, 2015; 82 pages.
Network Functions Virtualization and Software Management; Ericsson White Paper; Dec. 2014; 9 pages.
Cisco, White Paper: "NFV Management and Orchestration: Enabling Rapid Service Innovation in the Era of Virtualization"; 2015; 9 pages.
Intel, White Paper: "Using NFV Orchestration to Collapse Service Deployment and Service Assurance Silos" Dec. 2015; 12 pages.
Huawei, White Paper: "Observation to NFV"; 2014; 16 pages.

* cited by examiner

NETWORK SERVICE DESIGN AND DEPLOYMENT PROCESS FOR NFV SYSTEMS

This application is a 35 U.S.C. § 371 national phase filing of international application no. PCT/IB2017/055000, filed Aug. 17, 2017, which claims the benefit of U.S. provisional application no. 62/376561, filed Aug. 18, 2016, the disclosures of which are incorporated herein by reference in their entireties.

TECHNICAL FIELD

The present disclosure relates to network service design and deployment.

BACKGROUND

Network Functions Virtualization (NFV) is an emerging paradigm that builds on cloud computing and the virtualization technology to eliminate the drawbacks of traditional physical network infrastructure and that enables rapid provisioning of network services (NSs). With NFV, there is no need for the deployment of a wide range of network equipment, which requires substantial capital and operating expenses. NFV exploits the virtualization technology and cloud resources, and remodels the physical devices into virtual entities known as Virtualized Network Functions (VNFs) implemented as software packages.

The NFV reference architectural framework, standardized by the European Telecommunications Standards Institute (ETSI) and adopted by Topology and Orchestration Specification for Cloud Applications (TOSCA) defines several functional blocks, i.e., actors, playing different roles in the various phases of NS and VNF lifecycle management, from on-boarding to operations and monitoring.

Figure 1:
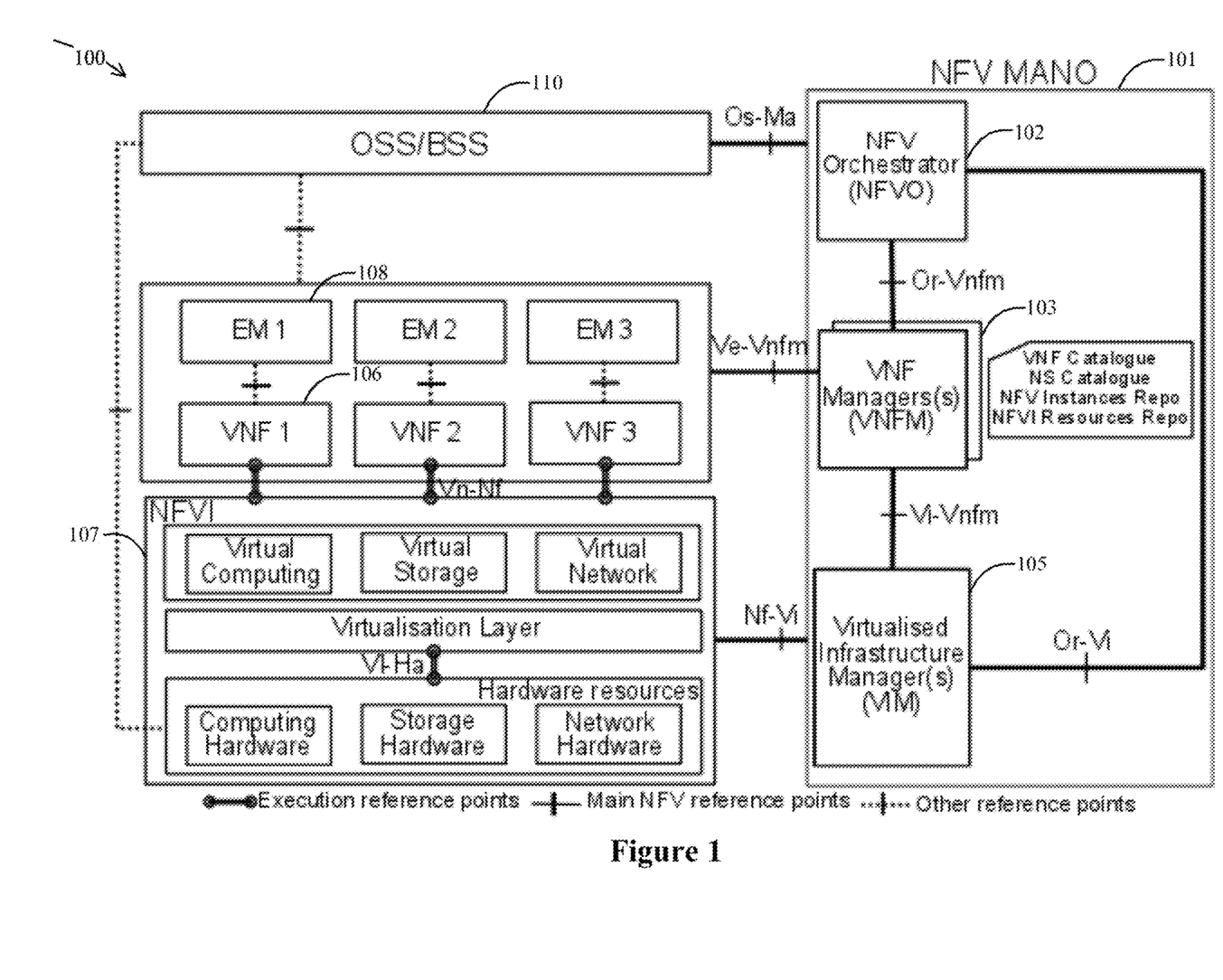
FIG. 1 is a diagram illustrating the NFV architecture proposed by ETSI.

FIG. 1 shows functional blocks in the NFV reference architecture proposed by ETSI. The current ETSI standard specifies the NFV reference framework, its functional blocks, their roles, their interfaces, and some NS and VNF-related operational flows.

However, the current ETSI standard does not provide network service design and deployment processes.

SUMMARY

There is provided a method for providing a Virtualized Network Function (VNF) according to Network Service (NS) requirements. The method comprises selecting an on-boarded VNF descriptor (VNFD) from a VNF catalogue, configuring parameters of the selected on-boarded VNFD according to the requirements of the NS and instantiating a VNF according to the configured on-boarded VNFD.

There is also provided a method for providing a Network Service (NS). The method comprises selecting an on-boarded NS Descriptor (NSD) from a NS catalogue, modifying NSD information of the selected on-boarded NSD and instantiating the NS according to the modified on-boarded NSD.

There is provided a system operative to provide a Virtualized Network Function (VNF) according to Network Service (NS) requirements, the system running in a cloud computing environment comprising a NFV Orchestrator (NFVO) and a VNF Manager (VNFM). The system is operative to select an on-boarded VNF descriptor (VNFD) from a VNF catalogue, configure parameters of the selected on-boarded VNFD according to the requirements of the NS and instantiate a VNF according to the configured on-boarded VNFD.

There is also provided a system operative to provide a Network Service (NS), the system running in a cloud computing environment comprising a NFV Orchestrator (NFVO). The system is operative to select an on-boarded NS Descriptor (NSD) from a NS catalogue, modify NSD information of the selected on-boarded NSD and instantiate the NS according to the modified on-boarded NSD.

There is provided a non-transitory computer readable media having stored thereon instructions for executing any one of the methods described herein.

The methods and systems provided herein present improvements over the ETSI standard.

DETAILED DESCRIPTION

Various features and embodiments will now be described with reference to the figures to fully convey the scope of the disclosure to those skilled in the art.

Many aspects will be described in terms of sequences of actions or functions. It should be recognized that in some embodiments, some functions or actions could be performed by specialized circuits, by program instructions being executed by one or more processors, or by a combination of both.

Further, some embodiments can be partially or completely embodied in the form of computer readable carrier or carrier wave containing an appropriate set of computer instructions that would cause a processor to carry out the techniques described herein.

In some alternate embodiments, the functions/actions may occur out of the order noted in the sequence of actions. Furthermore, in some illustrations, some blocks, functions or actions may be optional and may or may not be executed. Optional blocks are generally identified via dotted lines.

Referring again to FIG. 1 which shows the NFV reference architecture 100 as proposed in the ETSI standard, the main functional module in the architecture is the NFV Management and Orchestration (NFV-MANO) 101, which is in charge of deployment, management, and orchestration of NSs. The NFV-MANO 101 consists of three functional blocks: the NFV Orchestrator (NFVO) 102, the VNF Manager (VNFM) 103, and the Virtualized Infrastructure Manager (VIM) 105. These functional blocks are referred to as actors.

The main responsibilities of the NFVO include the NS orchestration and lifecycle management, e.g. (1) on-boarding VNFs and NSs; (2) instantiation of NSs and VNFMs; and (3) NS policy management related to affinity/anti-affinity, scaling, fault, and performance.

VNF Manager (VNFM) 103 is in charge of the lifecycle management of VNF instances. A VNFM is assigned to each VNF instance. However, a VNFM may also manage multiple VNF instances. The main responsibilities of VNFM include the instantiation, configuration, update and upgrade management, modification, scaling, and termination of its VNFs performed in collaboration with the NFVO.

Virtualized Infrastructure Manager (VIM) 105 manages and orchestrates the NFVI resources. The additional functionalities of the VIM include the allocation, upgrade, release, reclamation, usage optimization, capacity discovery, and capacity/usage reporting of physical and virtual resources. The VIM supports the management of VNF Forwarding Graphs (VNFFGs), which includes creating and maintaining virtual links (VLs). VIM also performs the NFVI physical and software resource repository management.

The NFV reference architecture includes other functional blocks, like the VNF 106, the EM 108, the NFVI 107, and the OSS/BSS 110 which are now described.

Virtualized Network Functions (VNFs) 106 are the building blocks of an NS in NFV. VNFs are software pieces with the same functionality as their corresponding physical network functions (PNFs), e.g. a virtual firewall (vFW) vs. a traditional firewall device. A VNF 106 can be composed of multiple internal components (VNFC). The description of the deployment and operational behavior of a VNFC is defined as a Virtual Deployment Unit (VDU). For each VNF, a manager (a VNFM) 103 is assigned in the NFV framework to manage its lifecycle.

Element Management (EM) 108 carries out the fault management, configuration, accounting, performance, and security (FCAPS) functionality for one or multiple VNFs 106. The EM (1) 108 configures a VNF to provide a specific network function and performs the fault management related to that network function; (2) manages accounting, e.g. billing, for the usage of VNF functions; (3) performs the security management for the VNF functions; (4) works together with the VNFM by exchanging information on NFVI resources to manage the virtualized resources for a VNF.

Network Function Virtualization Infrastructure (NFVI) 107 is the platform on which the network services are deployed. The NFVI has the physical layer of devices for computation, storage, and network; the virtualization layer, e.g. hypervisor; and the virtualized resources, e.g. virtual machines. The NFVI 107 is the totality of physical and virtual resources.

Operations Support Systems and Business Support Systems (OSS/BSS) 110 refer to the operator's proprietary systems and management applications supporting their business. The OSS/BSS systems 110 exchange a lot of information with NFV-MANO 101 functional blocks to provide the desired network service. Moreover, in the NFV architecture, the OSS/BSS 110 provides management and orchestration of legacy systems.

Figure 2:
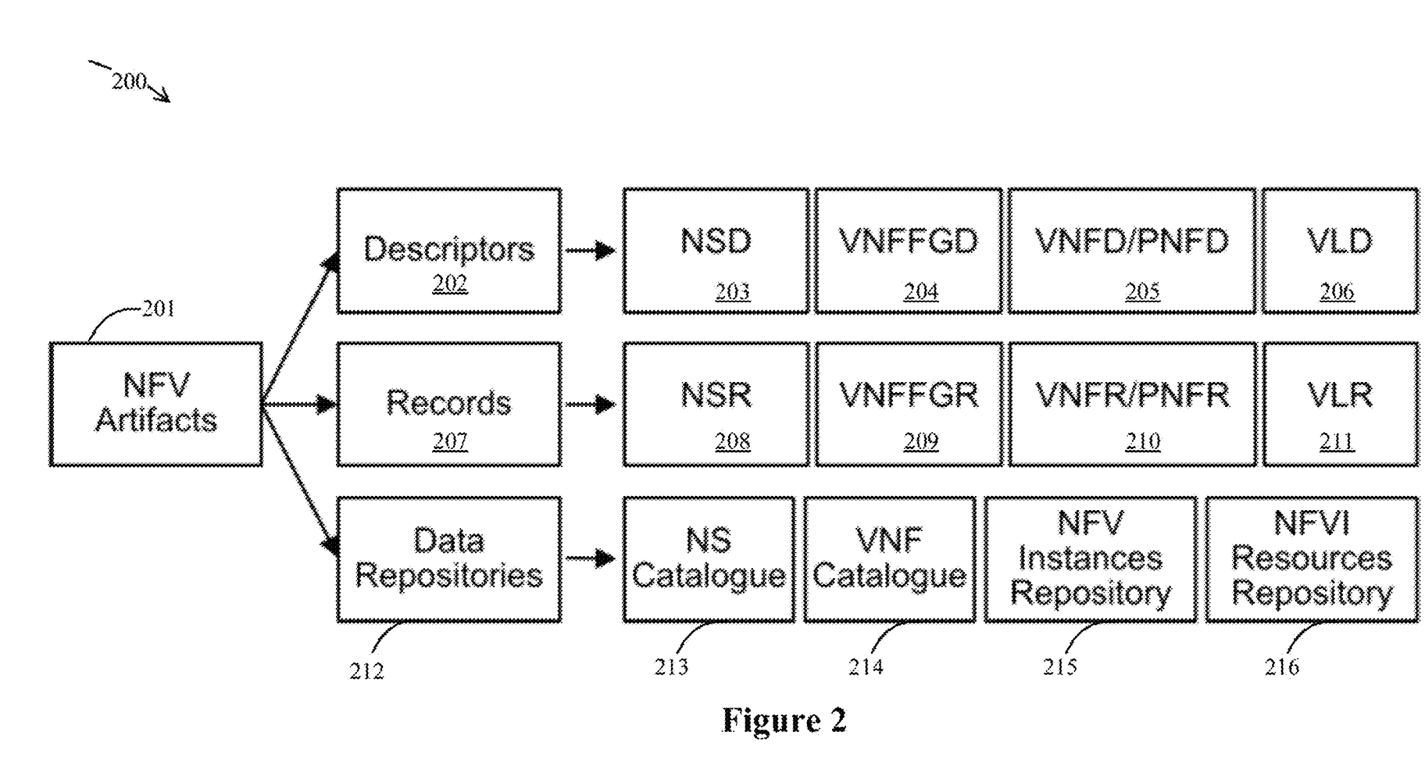
FIG. 2 is a diagram illustrating NFV artifacts.

During the lifetime of an NS, various artifacts 201 at various levels of abstractions are used and produced. The artifacts 201 can be divided into three categories: descriptors 202, records 207, and data repositories 212, as shown in FIG. 2.

Descriptors 202 describe the deployment requirements, operational behavior, and policies required by the NSs or VNFs. The virtual links (VLs) that connect VNFs to form a network topology also come with their descriptors (Virtual Link Descriptors (VLDs) 206). Similarly, the VNF Forwarding Graph (VNFFG) has a descriptor, i.e., VNFFGD 204, which defines an end-to-end sequence of VNFs that packets traverse. All these descriptors, e.g. NSDs 203, VNFDs 205, VNFFGDs 204, and VLDs 206, are known as deployment templates.

Records 207 describe individual instances of NSs, VNFFGs, VNFs/PNFs and VLs, in NSRs 208, VNFFGRs 209, VNFRs/PNFRs 210 and VLRs 211 respectively. These records are stored within the NFV Instances Repository.

Data Repositories 212 that are defined in the NFV architecture are (1) the NS Catalogue 213 containing all the on-boarded NSDs, VNFFGDs, and VLDs; (2) the VNF Catalogue 214 containing all the on-boarded VNFDs; (3) the NFV Instances Repository 215 containing all the instance records; and (4) the NFVI Resources Repository 216 holding information about the available, reserved, and allocated NFVI resources as updated by the VIM.

A workflow for NS and VNF deployment and management will be described and comprises a chaining of the different functions and operations defined in the standard. These functions and operations are grouped into activities. The relations and dependencies between these activities as well as the dependencies and the relations between the NFV reference framework functional blocks are explicitly defined in the workflow. The proposed workflow is compliant with the NFV reference framework as it obeys to the standard definitions of the functional blocks, roles, and interfaces.

Moreover, this process goes beyond the reference framework and proposes the automatic generation of a new NS Descriptor (NSD) and other artifacts from the tenant's NS requirements and the catalogue of VNF Descriptors (VNFDs) upon tenant request.

This workflow is a first step toward the necessary automation of network service design and deployment process for NFV systems. To achieve this, the following steps are followed (1) investigate and identify the different functions and operations in relation to the functional blocks; (2) identify and capture various interactions among the functional blocks; (3) identify the limitations and open issues in the NFV reference framework; (4) determine how the different artifacts are refined throughout the process; (5) fill the gaps and define a concrete process, with high level activities for grouping together operations and functions defined in the standard, that is compliant to the NFV reference framework.

The ETSI standard includes a discussion on the initiation and deployment process of NSs and VNFs. As mentioned in the standard, a network service is requested by a tenant's OSS/BSS 110. The NFVO 102 then on-boards the VNFDs into the VNF Catalogue and the NSD, the VNFFGDs, and the VLDs into the NS Catalogue. During on-boarding, the NFVO checks the integrity of NSD, VNFFGD, VLD, and VNFD/PNFD. Once the descriptors have been on-boarded the NS can be instantiated on request.

In the course of the instantiation process, the NFVO 102 receives additional instantiation parameters from the entity (e.g. OSS/BSS 110) initiating the instantiation process. These instantiations input parameters contain information on deployment flavors and are used to customize a specific NS instance and its VNF instances. The deployment flavors specify parameters for central processing unit (CPU) utilization and other factors related to the virtual machine on which the VNFs are deployed. The instantiation process results in various records, namely the Network Service Records (NSRs), the VNF Records (VNFRs), the Virtual Link Records (VLRs), and the VNFFG Records (VNFFGRs). This is followed by the deployment of the NS and the associated VNFs.

Some limitations and open issues that are not addressed in the current NFV standard have been identified:

- Although the NFV framework describes three functional blocks under MANO, they are typically not implemented separately due to lack of clear segregation of responsibilities during the instantiation and deployment phases.
- The standard identifies various orchestration functions and operations along with operational flows that are part of the NS and VNF lifecycle management. The standard does not propose any logical grouping of these functions and operations.
- The standard does not specify explicitly the dependencies among the various functional blocks in the NFV framework, i.e., how the functions and operations are interdependent to achieve the NFV goals.
- As a consequence, there is no concrete process (or workflow) that defines the execution order of the various functions and operations. A detailed and concrete process model is required to put the reference framework into practice. It will enable the automation of network service deployment and management.

A vendor providing a VNF implementation may not want to restrict it in the associated VNF descriptor (VNFD) to a particular deployment option, but may want to allow for the widest possible range of options appropriate for the deployment. Compared to this, a given NFVI may limit the deployment options, for example, due to some policies or available resource of the operator/NFV provider. Furthermore, an NS may impose further limitations depending on the tenant's policies and/or targeted key performance indicator (KPI) values. Considering that the same VNF package may be used to implement different NSs with diverse policies and KPIs the use of the same VNFD can be problematic. Currently, the specifications do not distinguish these different stages and define only a single VNFD associated with each VNF to reflect these scenarios. A detailed process can distinguish these different stages and the different tailorings.

An NS design and deployment which is compliant to the NFV reference framework is therefore proposed. In this process, high level activities for grouping the different functions and operations, their dependencies and relationships are identified. The inputs, outputs of each activity and the tailoring of the artifacts are clearly specified. In addition, going beyond the standard, an activity is included for the automated design of the NSD from the tenant's NS requirements (NSReq). This activity is referred to as the NS Design activity. This leads to an additional limitation of the current specifications:

- The NFV specifications focus on the virtualisation and software management aspects of the VNFs, e.g. the interfaces and KPIs. However, the current specifications do not define any method that would help in identifying the functionalities a VNF can provide for its users.

Figure 3:
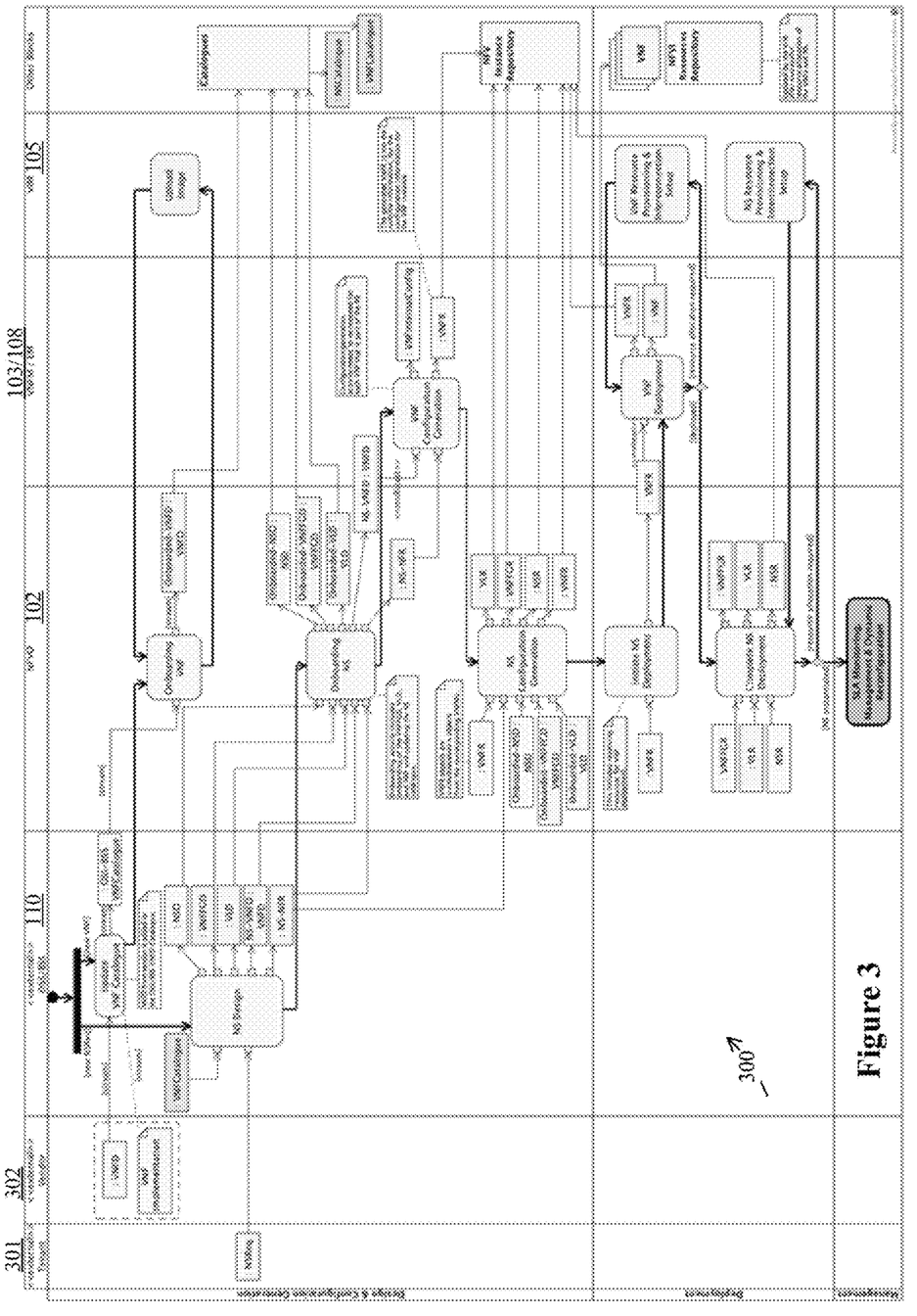
FIG. 3 is a flowchart of an NS management process according to an embodiment.

Turning to FIG. 3, the network service design, configuration and deployment process 300 will be described. The functions of the OSS/BSS 110 in the context of the proposed process are elaborated, and a workflow which is a chaining of the various NFV functions and operations grouped into activities required to carry out NS deployment is proposed. This work is based on the VNF as a Service (VNFaaS) model as defined in the ETSI standard. Further to that, the OSS/BSS 110, the EM 108, and other external subsystems (NFVI resources repository, NFV instance repository, NS and VNF catalogues) are brought into the picture along with the NFV-MANO 101 to propose the new NS design and deployment process.

The activities that are part of the workflow are identified and described (based on the orchestration functions and operations defined in the ETSI standard) along with the dependencies (in terms of information elements) between the activities which sets a well-defined scope for each of them. The actor responsible for each of these activities, including the activity of NS design, is also identified. The NS design is a complex activity that is outside the scope of the NFV standard. Before presenting the whole process, NS design activity is described briefly.

In the proposed process, the policy management (e.g. scaling and threshold) and monitoring aspects of NS that are required to carry out service level agreement (SLA) monitoring, management and dynamic reconfiguration are abstracted and the focus put on the design and deployment of network services.

Network service design entails the definition of deployment templates (namely NSD, VNFFGD, and VLD), which includes static information elements related to an NS. This NSD is used by the orchestrator during the deployment.

There is proposed a method for NSD generation in which a tenant may request a new NS by specifying the NSReq, which consists of functional and non-functional requirements possibly with some initial decomposition targeting specific VNFs. It is assumed that the OSS/BSS of an NFV provider gets the NSReq and generates the NSD based on the provider's VNF Catalogue. The NSD generation method involves the decomposition of the NSReq and the selection of proper network functions, e.g. VNFs and PNFs from the VNF Catalogue. The NSD management may also involve PNFD management such as PNFD on-boarding, update, deletion and query. A person skilled in the art would understand that the management of PNFDs is similar to that of VNFDs and is not described here.

The NSReq decomposition is guided by a network function ontology (NFO), which captures standard network function (de)compositions as defined by different standardization bodies such as the 3rd generation partnership project (3GPP) as well as knowledge and experience from previous decompositions. The NFO captures the decomposition of network functionalities to a level of granularity where each functionality can be mapped onto some VNF provided functionality. When the decomposition reaches that level, VNFs from the VNF Catalogue are matched and selected to compose the network service. The selection takes into account the non-functional requirements and the VNFD of the selected VNFs are tailored accordingly to NS specific VNFDs, referred to as NS-VNFDs. During this activity, the VNF forwarding graph descriptor (VNFFGD) and the virtual link descriptors (VLD) are also generated.

Still referring to FIG. 3, the NS design and deployment process is described as a model-based workflow covering the phases from NS design to deployment. With the process, the gaps are bridged between the various functional blocks and the various activities that are part of NS design and deployment. Having a model-based process also allows to take advantage of the ETSI/TOSCA defined NFV profiles.

The Process Model (PM) illustrated in FIG. 3 shows the control-flow and data-flow among the actors involved in the process. In an embodiment, the PM language is a variant of the Formalism Transformation Graph (FTG)+PM language and the PM is modelled using the unified modeling language (UML) 2.0 activity diagram formalism which is typically used to model software and business processes. The formalism allows the modelling of concurrent processes and their synchronization with the use of fork and join nodes. Both control-flow and object-flow can be depicted in the model. An activity node can either be a simple action (representing a single step within an activity) or an activity (representing a decomposable activity which embeds actions or other activities). An activity specifies a behavior that may be reused, i.e. an activity can be included in other activity diagrams to invoke behavior. For representation purpose and to add clarity to the entire process, activity diagram partitions (a.k.a., swim lanes) are used, where each partition represents one actor (participating functional block) in the process. Multicasting and multi-receiving are used in conjunction with partitions to model object flows between activities that are the responsibility of objects determined by a publish and subscribe facility. Object flows are tagged with "multicast" or "multi-receive" in this case. Since UML2.0 activity diagrams are given semantics in terms of Petri Nets, the precise formal semantics allow the activity diagrams to be simulated and analyzed.

In the present PM, the artifacts are considered as models (instances which conform to existing meta-models) which are either inputs or outputs of activities.

The PM covering the design, configuration generation, and deployment activities is presented in details in FIG. 3. Along with the high-level activities, the PM clearly shows the input and output models associated with each activity via input and output pins (denoted by the tiny squares on the activity border). In the PM, thin edges denote object-flow, while thick edges denote control-flow. The join and the fork constructs are represented as horizontal bars.

The role of each NFV functional block is shown as partitions in the PM. The partitions tagged as "external" denotes blocks and actors outside the NFV-MANO. The partition labelled as Other Blocks includes blocks in the NFV architecture that are considered as black-boxes in our work and which communicate with the other actors via predefined interfaces.

The activities, the associations between the different actors, and the dependencies between the activities, are discussed in more details below.

The activities (1) and (3) in the following list can be carried out concurrently (shown with the parallel flow coming out of the fork construct in FIG. 3). Also, activities in (1) and (2) are continuous activities and not part of the process for the NS design and deployment, which starts with the NS design activity triggered by a tenant's 301 request for a new service. The steps of the process are now described.

(1) Update VNF Catalogue (actor: OSS/BSS). The vendor 302, an external actor, sends a new VNF package (including the VNFD and the VNF Implementation). The VNF package is received by the OSS/BSS 110 (also an external actor) and the OSS-BSS VNFCatalogue maintained by the OSS/BSS is updated. This is a continuous behavior which accepts a stream of incoming VNF packages from vendors and updates the internal catalogue. To show streaming, the text annotation stream is placed near the (input/output) pin symbol in the PM.

(2) On-boarding VNF (actor: NFVO). The NFVO 102 takes the VNF specification and configuration data that is part of the incoming VNF package from the OSS-BSS VNFCatalogue to on-board the VNFs. The NFVO 102 validates the VNFD and updates the VNFCatalogue (maintained by NFV-MANO) with the On-boarded-VNFD, which is the vendor provided VNFD tailored by NFVO according to the constraints and policies of the given NFV system. After that, the NFVO 102 requests VIM 104 to upload the VNF image (triggering the Upload Image action). The on-boarding of a VNF is required prior to its deployment. On-boarding is a continuous behavior which periodically receives vendor-provided VNF packages from the OSS/BSS and streams out the On-boarded-VNFD model for each incoming VNF. At this point, the On-boarded-VNFDs are still generic with respect to the NSs, as in they are not associated with any NS. The VNFs are made NS specific in the NS Design activity.

(3) NS Design (actor: OSS/BSS). The tenant 301, an external actor, requests a new network service by providing a new NSReq which triggers the whole process starting with the NS design activity within the OSS/BSS 110. The activity also takes as input the NFV-MANO VNFCatalogue consisting of On-boarded-VNFDs, to produce an NSD according to the available VNFs. The deployment templates including the NSD, VNFFGD and the VLD to be deployed are created during this activity as described in Section 4.1. The On-boarded-VNFDs (from (2)) are specialized for this NS resulting in NS-VNFDs. An additional model, NS-NFR is also output and contains the non-functional requirements (NFR) specified in the NSReq that need to be carried forward and addressed during the configuration generation activity.

(4) On-boarding NS (actor: NFVO). Following the NS design, the NFVO 102 continues with on-boarding the NS. On-boarding entails validating the NSD, VNFFGD, and VLD to check for missing elements and updating the NS Catalogue. This activity tailors the deployment templates resulting in the artifacts On-boarded-NSD, On-boarded-VNFFGD and On-boarded-VLD. The NS-specific VNFD(s) and the NFRs are received from the OSS/BSS 110 and forwarded to the corresponding VNFM 103 through the NFVO 102.

(5) VNF Configuration Generation (actor: VNFM/EM). Following the NS on-boarding by the NFVO 102, the NS-specific VNFs need to be configured with deployment-specific details (based on their deployment templates) to proceed with deployment. The internal configuration of each VNF is generated as part of this activity. The internal connections between the VNF components (VNFC) are also configured. A configuration generation request (along with the NS-VNFD and the NS-NFR) is received from the NFVO 102 by each VNFM 103 which may involve the EM 108 in the activity. Each configuration generation includes the generation of the VNFInternalConfig and the VNF record (VNFR). The internal configuration may determine what the VNF configuration should be and how the VNFR should be created. The NS-NFR is used to determine the number of instances of VNFs. The records created are stored in the NFV Instance Repository. The VNFMs respond by returning the VNFRs created to the NFVO 102, which is done via multi-receive, i.e. the objects in the flow are gathered from respondents to multicasting.

(6) NS Configuration Generation (actor: NFVO). The deployment-specific details of an NS are now generated to enable NS deployment. Once the VNFRs are created for the VNFs, the NS configuration activity is triggered by the NFVO 102 (once all VNFR input models for the associated VNFs are available for the activity). The external links (VLs) between the VNFs are configured during this stage. The instantiation takes into account the constraints defined in NS-NFR. The records created (e.g. VNFFGR, VLR and NSR) representing the NS instances along with the refined VNFRs are saved in the NFV Instance Repository.

(7) Initiate NS Deployment (actor: NFVO). The NFVO 102 then initiates the NS deployment. This begins with the deployment of the VNFs that are part of the NS. The NFVO 102 checks for resource availability for each VNF. The resource reservation for the VNFs can also optionally be carried out by the NFVO 102 via the VIM 105. Once the resources are reserved, the NFVO 102 sends the reservation acknowledgment to the corresponding VNFM 103 (by multicasting the VNFRs). The VIM 105 identifier is also passed to inform the VNFM 103 where to deploy the VNF. This triggers the deployment of the VNFs by the VNFMs 103. It is also possible that OSS/BSS 110 controls the deployment and this activity is only triggered upon its request.

(8) VNF Deployment (actor: VNFM/EM). Once the resource reservation is completed in activity (7), each VNFM 103 communicates with the VIM 105 for resource allocation. The VNF Resource Provisioning and Interconnection Setup action is triggered in the VIM 105. The VNFM 103 then configures the VNF with deployment-specific parameters (VNF-specific lifecycle parameters), which involves instantiation and configuration of the VNF components according to the VNFR. The EM 108 is involved with the configuration of VNF with application-specific parameters to complete the actual VNF deployment. At this point the VNFR is updated as well as the NFVI Instance Repository. Once all the VNFs are deployed, the NFVO 102 continues with the NS deployment.

(9) Complete NS Deployment (actor: NFVO). Following the deployment of the VNFs, the NFVO 102 continues to deploy the NSR, VLR, and VNFFGR by requesting the VIM 105 for network connectivity creation. The NS Resource Provisioning and Interconnection Setup action is triggered at this point. Upon confirmation from the VIM 105 of successful creation of network connectivity, the NFVO 102 requests the VIM to connect the VNFs to the network (setting up the VLs that are part of the VNFFG(s)). The deployment parameters in the records are updated as well as the NFVI Instance Repository.

According to the ETSI standard, it is possible to initiate resource allocations in different ways. For this reason, in the standard there are several variants of the operational flow for VNF and NS deployment (depending on whether the resource allocation is initiated by the NFVO 102 or the VNFM 103). Therefore, it should be noted that it is possible to have variations in the workflow that is depicted in the PM depending on the interaction model chosen.

Following deployment, the NS instance management continues until it is decommissioning.

In the NFV domain, various artifacts are used. However, with respect to the VNFD, there could be a substantial shift from what is initially provided by the VNF vendor and the specific version that is deployed at the end for a specific tenant.

Figure 4:
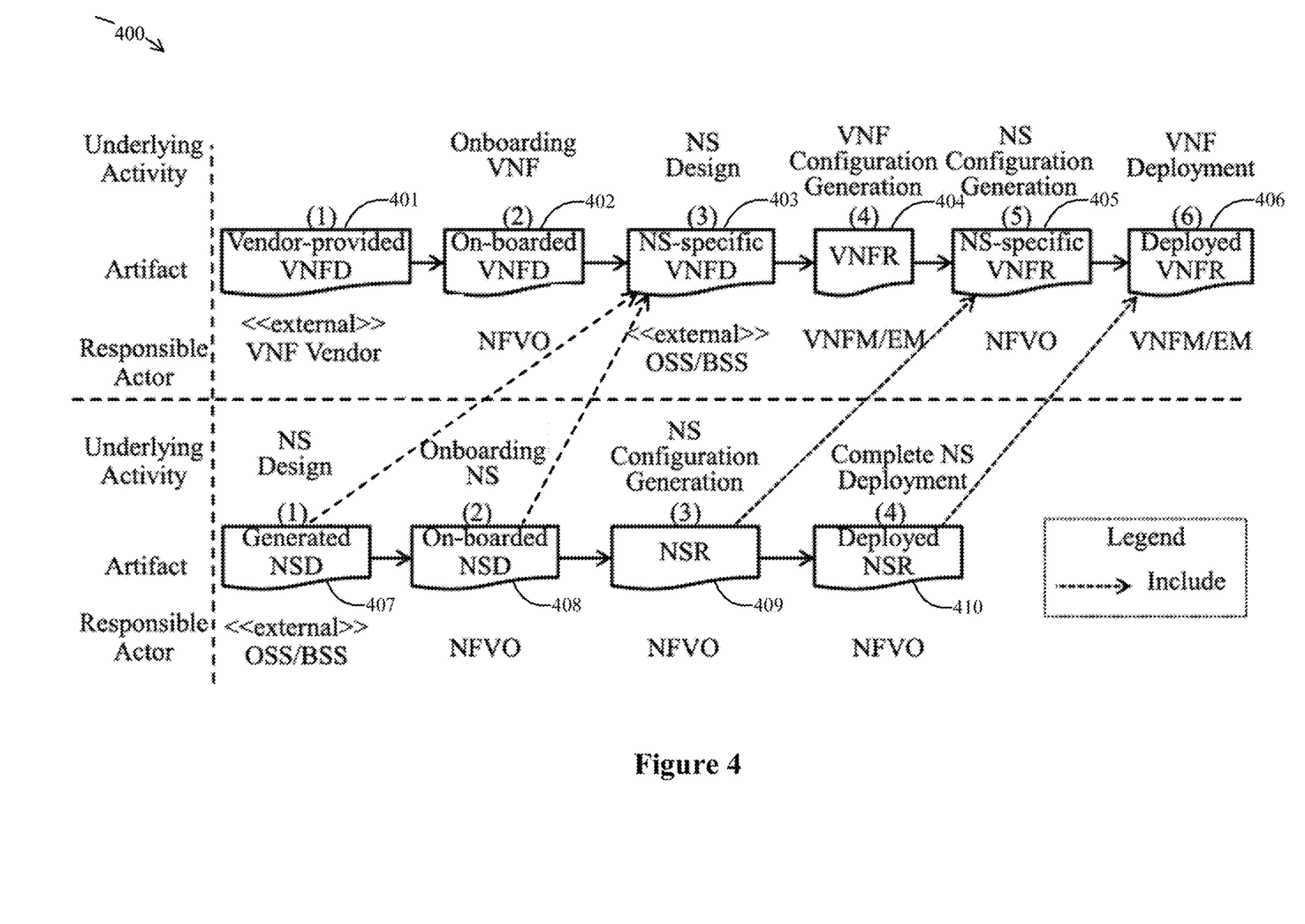
FIG. 4 is a flow diagram illustrating successive tailoring of VNFs and NSs.

The current NFV specification does not discuss the different specializations an artifact goes through during the NS design and deployment process. The NFV artifacts, for example the VNFD and NSD, get transformed through a chain of activities as shown in FIG. 4, which illustrates different tailorings of the VNFD and the NSD to complement the PM. Artifacts (other than VNFD and NSD), such as the VLDs, the VNFFGDs, and the various catalogues/repositories can also be tailored.

VNFD Tailoring 400 is now discussed in relation to the top part of FIG. 4. An initial Vendor-provided VNFD 401 is generic, i.e., open to many deployment options of the VNF, and includes the VNF identification data (e.g. ID, vendor, and version), VNF-specific data (e.g. connectivity requirements, inter-dependencies of VNFCs, and deployment flavors), VNFC data (e.g. specific VNFC configuration data and deployment constraints), and virtualized resource requirements (step 1). For the On-boarded-VNFD 402, the orchestrator checks for any missing mandatory information elements in the VNFD and provides with the default values, if required according to the policies and constraints of the given NFV system, which is the first tailoring of a VNFD (step 2). The NS-specific VNFDs 403 are the result of VNF selection from the VNFCatalogue and their tailoring for a specific NS based on the NSReq from the tenant where various VNF/VNFC deployment constraints and virtualized network resource requirements might be added/updated in the VNFD by the OSS/BSS (step 3). Once the VNFDs are tailored to be NS-specific, the VNFM/EM configures VNF-specific data for VNF instantiation. The VNFR 404 is created and the VDU-level configuration is performed. Additional information elements are introduced in the VNFR, for instance, information on the parent NS, the logging capabilities for audit purpose, the network address, and the VNFM managing this instance (step 4). A further tailoring of the VNFR is possible based on the deployment flavor and geographical location constraint, which results in NS-specific VNFR 405 (step 5). During the deployment of the VNFs, the policies, e.g. affinity and anti-affinity rules, are applied between VMs and hosts, which results in the refinement of VNFRs (deployed VNFR 406) to adhere to the policies (step 6).

NSD Tailoring 400 is now discussed in relation to the bottom part of FIG. 4. The Generated NSD 407 includes the (On-boarded) NS-specific VNFDs 403, the VNFFGDs, and the VLDs (step 1). For the On-boarded NSD 408, the NFVO checks for any missing mandatory information elements in the NSD and provides with the default values, if required according to the policies and constraints of the given NFV system, which is the first tailoring of an NSD (step 2). Later, the NFVO instantiates the NS by creating a network service record (NSR) 409 by adding additional information to the On-boarded-NSD 408, for instance, information on NFVI resources reserved for this NS instance, the NS status, and the logging capabilities for audit purpose (step 3). During the deployment of an NS, various policies (e.g. the NS scaling policy) are provided from OSS/BSS resulting a further refinement of an NSR (deployed NSR 410) (step 4).

The PM described above may have workflow variations, i.e. the NSD can be designed from scratch or an existing NSD can be reused based on the new functional/non-functional requirements from tenants. The proposed PM can be enacted using the benefits of model-driven engineering with a final goal to automate the workflow for designing and deploying an NS.

In one embodiment, the proposed process covers the design, configuration and deployment of a new network service triggered by a request from a tenant in the form of an NSReq consisting of functional and non-functional requirements. The NS Design activity can include a function for checking the NS Catalogue for a service that meets the NSReq before starting the design and reusing what is already available. However, if the non-functional requirements are taken into account in the design of the NS, the probability of a matching NSD is low. One can think of an alternative workflow where the NSReq consists only of functional requirements to improve NS re-usability. In this case the NS is designed with multiple versions in a first step and the non-functional requirements are taken into account only in a second step where a specific version that can meet the non-functional requirements is selected and tailored further to meet the non-functional requirements. Different tenants with different non-functional requirements may reuse the same NSDs. The provider can reuse existing network services (NSDs) to configure and instantiate network services based on varying non-functional requirements.

In an embodiment, the process is triggered by a new network service request from a tenant. From then on, the process can be executed automatically. It is also possible that, instead, the different phases of the process can be triggered by the OSS/BSS. Following NS on-boarding, the process can be suspended and resumed only when the OSS/BSS sends an instantiation and deployment request.

In another embodiment, using model-driven engineering (MDE) and model-based engineering (MBE), software models can play a role in the lifecycle management of a system. Having an effective and efficient way of coordinating these models, maintaining consistency, and managing the propagation of changes across the models. As a step in that direction, domain and processes are modeled using modelling languages that are well-established and have well-defined semantics, such as UML2.0 Activity Diagrams. The use of a such modelling language sets the pillars for model-driven process enactment or execution.

Figure 5:
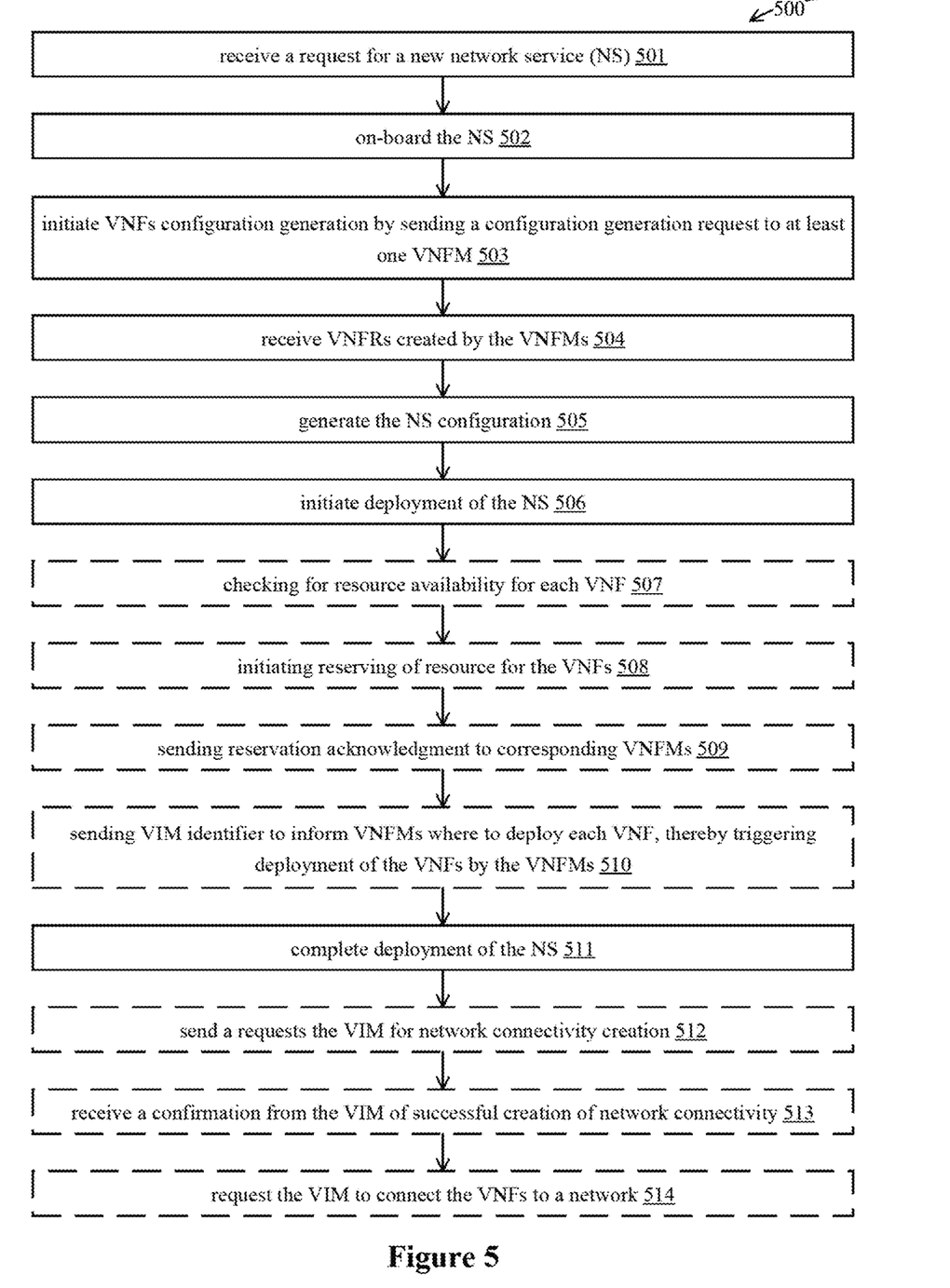
FIG. 5 is a flowchart of a method according to an embodiment.

FIG. 5 presents a flowchart of a method 500 executed by a NFV Management and Orchestration (NFV-MANO), the NFV-MANO being executed in a cloud computing environment which provides processing and interface circuits and memory for running the NFV-MANO, the memory containing instructions executable by the processing circuits whereby the NFV-MANO is operative to:
  receive, step 501, a request for a new network service (NS);
  on-board, step 502, the NS;
  initiate, step 503, virtualized network functions (VNFs) configuration generation by sending a configuration generation request to at least one VNF manager (VNFM);
  receive, step 504, VNF records (VNFRs) created by the VNFMs;
  generate, step 505, the NS configuration;
  initiate, step 506, deployment of the NS; and
  complete, step 511, deployment of the NS.

According to the method, the request for a new network service is received by an operations support system and business support system (OSS/BSS) and includes a new network service requirements (NSReq), which triggers NS design activity within the OSS/BSS and wherein a network function virtualization management and orchestration (NFV-MANO) VNFCatalogue, consisting of on-boarded VNFDs 402, is used to produce an NS descriptor (NSD) according to available VNFs.

According to the method, deployment templates including the NSD, VNF Forwarding Graph (VNFFG) descriptor (VNFFGD) and Virtual Link Descriptor (VLD) to be deployed are created and wherein an NS-NFR containing the non-functional requirements (NFR) specified in the NSReq is outputted.

According to the method, on-boarding comprises validating the NSD, VNFFGD, and VLD to check for missing elements and updating the NS Catalogue.

According to the method, on-boarding tailors/generates a deployment templates resulting in an On-boarded-NSD artifact, an On-boarded-VNFFGD artifact and an On-boarded-VLD artifact.

According to the method, NS-specific VNF descriptor(s) (VNFD(s)) and the NFRs are received from the OSS/BSS and forwarded to corresponding VNFM(s).

According to the method, a VNFM configures NS-specific VNFs with deployment-specific details.

According to the method, an internal configuration of each VNF is generated and internal connections between the VNF components (VNFC) are configured by the VNFM and element management (EM).

According to the method, the configuration generation includes the generation of a VNFInternalConfig and a VNFR and wherein records created are stored in the NFV Instance Repository.

According to the method, the VNFMs respond by returning the VNFRs created to the NFVO, which is done via multi-receive, i.e. the objects in the flow are gathered from respondents to multicasting.

According to the method, external links (VLs) between the VNFs are configured and instantiation takes into account the constraints defined in NS-NFR.

According to the method, deployment of the VNFs that are part of the NS comprises:
  checking, step 507, for resource availability for each VNF;
  initiating, step 508, reserving of resource for the VNFs;
  sending, step 509, reservation acknowledgment to corresponding VNFMs; and
  sending, step 510, VIM identifier to inform VNFMs where to deploy each VNF, thereby triggering deployment of the VNFs by the VNFMs.

According to the method, the above four steps are executed by the NFVO.

According to the method, once the resource reservation is completed:
  the VNFM communicates with the VIM for resource allocation;
  the VNFM trigger VNF Resource Provisioning and Interconnection Setup action in the VIM;
  the VNFM configures the VNF with deployment-specific parameters (VNF-specific lifecycle parameters), which involves instantiation and configuration of the VNF components according to the VNFR; and
  the element management (EM) configures the VNF with application-specific parameters to complete the actual VNF deployment.

According to the method, the NFVO is further operative to:
  send, step 512, a request the virtualized infrastructure manager (VIM) for network connectivity creation;
  receive, step 513, a confirmation from the VIM of successful creation of network connectivity; and
  request, step 514, the VIM to connect the VNFs to a network.

Figure 6:
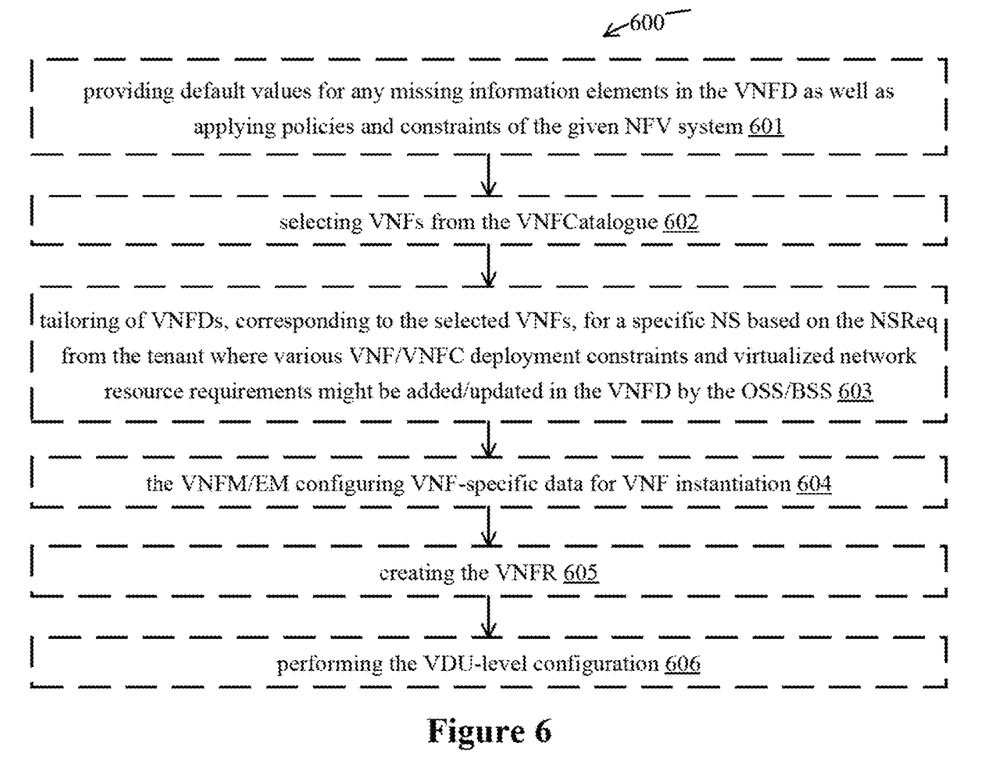
FIG. 6 is a flowchart of a method according to another embodiment.

FIG. 6 presents a flowchart of an embodiment 600 as described previously, wherein VNFD Tailoring is executed during the on-boarding step, starting with a generic Vendor-provided VNFD including VNF identification data, such as identifier (ID), vendor, and version, VNF-specific data, such as connectivity requirements, inter-dependencies of VNFCs, and deployment flavors, VNFC data, such as specific VNFC configuration data and deployment constraints, and virtualized resource requirements, the VNF tailoring comprising:
  providing, step 601, default values for any missing information elements in the VNFD as well as applying policies and constraints of the given NFV system;
  selecting, step 602, VNFs from the VNFCatalogue;

tailoring of VNFDs, step 603, corresponding to the selected VNFs, for a specific NS based on the NSReq from the tenant where various VNF/VNFC deployment constraints and virtualized network resource requirements might be added/updated in the VNFD by the OSS/BSS;

the VNFM/EM configuring, step 604, VNF-specific data for VNF instantiation;

creating, step 605, the VNFR; and performing, step 606, the virtual deployment unit (VDU)-level configuration.

According to the method, additional information elements are introduced in the VNFR, such as, information on the parent NS, logging capabilities for audit purpose, network address, and an identification of the VNFM managing this instance.

According to the method, during deployment of the VNFs, policies, such as affinity and anti-affinity rules, are applied between VMs and hosts.

Figure 7:
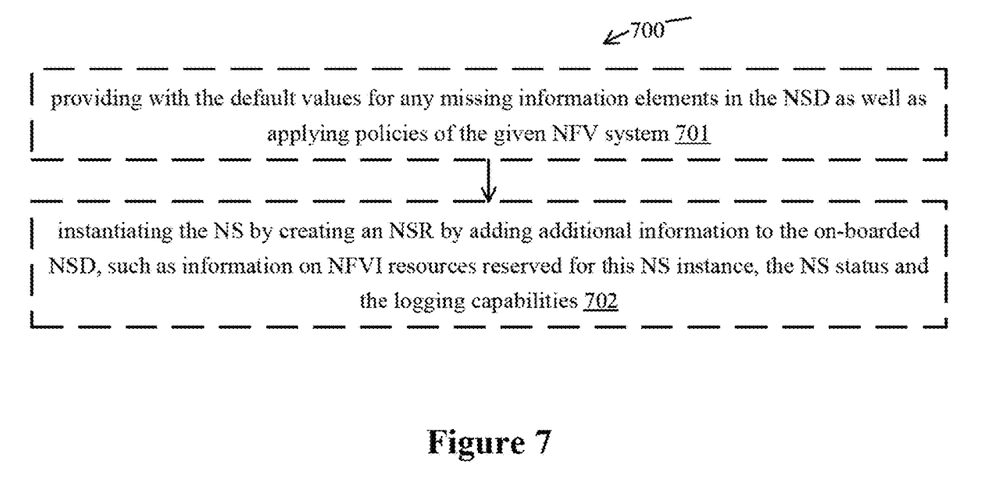
FIG. 7 is a flowchart of a method according to another embodiment.

FIG. 7 presents a flowchart of embodiment 700 as described previously, wherein NS Tailoring is executed, and wherein a Generated NSD includes the on-boarded NS-specific VNFDs, the VNFFGDs, and the VLDs, the NS tailoring comprising:

providing, step 701, with the default values for any missing information elements in the NSD as well as applying policies and constraints of the given NFV system;

instantiating, step 702, the NS by creating a network service record (NSR) from the on-boarded NSD by adding additional information, such as information on Network Function Virtualization Infrastructure (NFVI) resources reserved for this NS instance, the NS status, and the logging capabilities for audit purpose.

According to the method, during the deployment of an NS, various policies such as the NS scaling policy, are provided from OSS/BSS resulting a further refinement of an NSR.

There is provided a system comprising the NFV-MANO as described previously.

There is provided a non-transitory computer readable media having stored thereon instructions for instantiating the orchestrator as described previously, operative to execute steps as described previously.

Figure 8:
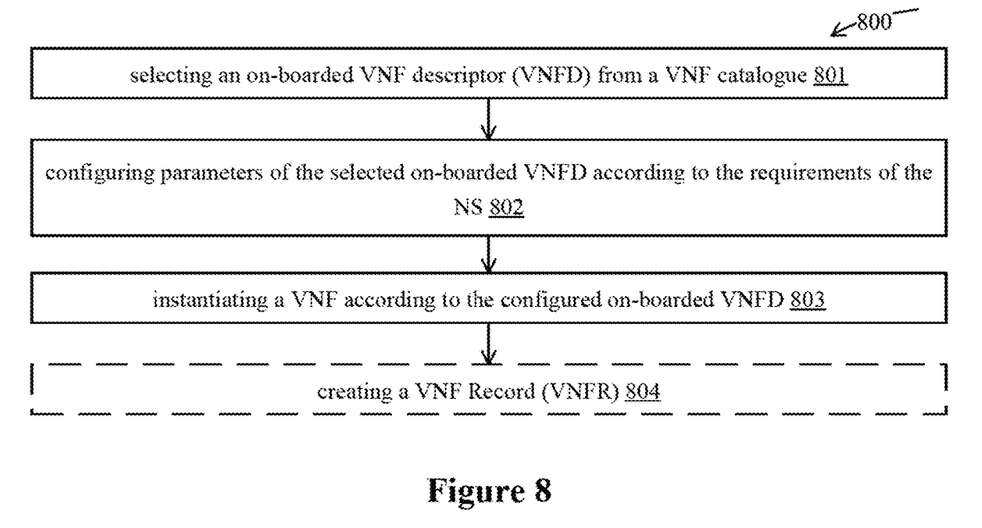
FIG. 8 is a flowchart of a method according to another embodiment.

FIG. 8 illustrates a method 800 for providing a Virtualized Network Function (VNF) according to Network Service (NS) requirements. The method comprises selecting, step 801, an on-boarded VNF descriptor (VNFD) from a VNF catalogue, configuring, step 802, parameters of the selected on-boarded VNFD according to the requirements of the NS, and instantiating, step 803, a VNF according to the configured on-boarded VNFD.

The method may be executed in a Network Functions Virtualization (NFV) system, running in a cloud computing environment, comprising a NFV Orchestrator (NFVO) on-boarding the VNFD in the VNF catalogue and configuring the parameters of the selected VNFD, and a VNF Manager (VNFM) instantiating the VNF.

The method may alternatively be executed in a Network Functions Virtualization (NFV) system, running in a cloud computing environment, comprising a NFV Orchestrator (NFVO) on-boarding the VNFD in the VNF catalogue, an Operations Support Systems and Business Support Systems (OSS/BSS) configuring the parameters of the selected VNFD, and a VNF Manager (VNFM) instantiating the VNF.

The VNFD may comprise VNF identification data, VNF-specific data, VNFC data, and virtualized resource requirements. The VNF identification data may comprise an identifier (ID), a vendor, and a version. The VNF-specific data may comprise connectivity requirements, inter-dependencies of VNF components (VNFCs), and deployment flavors. The VNFC data may comprise data such as specific VNFC configuration data and deployment constraints. Configuring parameters may comprise providing values for information elements in the VNFD and the values may be default values. Configuring parameters may further comprise updating the VNFD with deployment constraints and virtualized network resource requirements. In some embodiments, the VNFD may be duplicated or copied, before the updating step, to keep a copy of the original VNFD.

The method may further comprise creating, step 804, a VNF Record (VNFR) and the NFVO may create the VNF Record (VNFR). The VNFM may update the VNFR with further configuration information.

Figure 9:
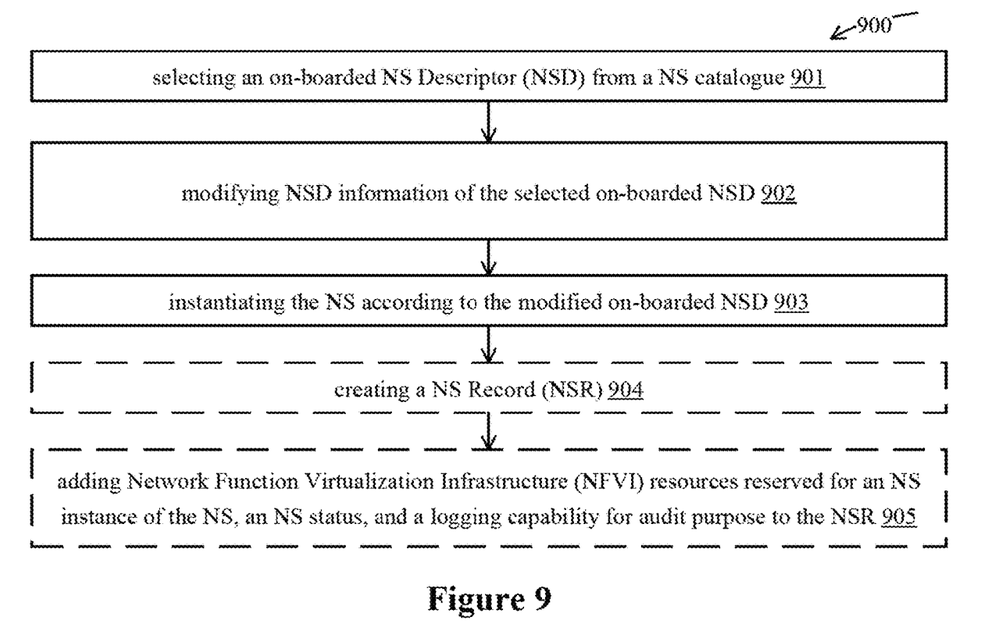
FIG. 9 is a flowchart of a method according to another embodiment.

FIG. 9 illustrates a method 900 for providing a Network Service (NS). The method comprises selecting, step 901, an on-boarded NS Descriptor (NSD) from an NS catalogue, modifying, step 902, NSD information of the selected on-boarded NSD and instantiating, step 903, the NS according to the modified on-boarded NSD.

The method may be executed in a Network Functions Virtualization (NFV) system, running in a cloud computing environment, comprising a NFV Orchestrator (NFVO) on-boarding the NSD in the NS catalogue and configuring the parameters of the selected NSD. The modifying information may comprise providing values for information elements in the NSD and the values may be default values. The information may comprise information related to constraints or policies of the NFV system.

The method may further comprise creating, step 904, an NS Record (NSR) and may also comprise adding, step 905, Network Function Virtualization Infrastructure (NFVI) resources reserved for an NS instance of the NS, an NS status, and a logging capability for audit purpose to the NSR.

Returning to FIG. 1, there is provided a system 100 operative to provide a Virtualized Network Function (VNF) 106 according to Network Service (NS) requirements, the system running in a cloud computing environment comprising a NFV Orchestrator (NFVO) 102 and a VNF Manager (VNFM) 103. The system 100 is operative to select an on-boarded VNF descriptor (VNFD) from a VNF catalogue, configure parameters of the selected on-boarded VNFD according to the requirements of the NS and instantiate a VNF according to the configured on-boarded VNFD.

Still referring to FIG. 1, there is provided a system 100 operative to provide a Network Service (NS), the system running in a cloud computing environment comprising a NFV Orchestrator (NFVO) 102. The system is operative to select an on-boarded NS Descriptor (NSD) from an NS catalogue, modify NSD information of the selected on-boarded NSD and instantiate the NS according to the modified on-boarded NSD.

Modifications and other embodiments will come to mind to one skilled in the art having the benefit of the teachings presented in the foregoing description and the associated drawings. Therefore, it is to be understood that modifications and other embodiments, such as specific forms other than those of the embodiments described above, are intended to be included within the scope of this disclosure. The described embodiments are merely illustrative and should not be considered restrictive in any way. The scope sought is given by the appended claims, rather than the preceding description, and all variations and equivalents that fall within the range of the claims are intended to be embraced therein. Although specific terms may be employed herein, they are used in a generic and descriptive sense only and not for purposes of limitation.

The invention claimed is:

1. A method for designing and providing a tailored Network Service (NS), and for deploying a corresponding NS comprising:
   selecting an on-boarded NS Descriptor (NSD) from a NS catalogue;
   modifying NSD information of the selected on-boarded NSD, thereby obtaining a tailored NSD, wherein the tailored NSD comprises a tailored Virtualized Network Function descriptor (VNFD) and wherein the tailored VNFD comprises VNF-specific data comprising connectivity requirements, inter-dependencies of VNF components (VNFCs), and deployment flavors; and
   instantiating the NS according to the tailored NSD, by creating and deploying a network service record (NSR).

2. The method of claim 1, further comprising:
   selecting an on-boarded VNFD from a VNF catalogue; and
   configuring parameters of the selected on-boarded VNFD according to requirements of the NS, wherein configuring parameters comprises adding or updating values of information elements in the selected on-boarded VNFD, thereby obtaining the tailored VNFD.

3. The method of claim 2, wherein the method is executed in a Network Functions Virtualization (NFV) system, running in a cloud computing environment, comprising a NFV Orchestrator (NFVO) operative for on-boarding vendor-provided VNFDs in the VNF catalogue and for configuring the parameters of the on-boarded VNFDs, and comprising a Virtual Network Function (VNF) Manager (VNFM) operative for instantiating VNFs based on on-boarded VNFDs.

4. The method of claim 3, wherein the NFVO is further operative for creating a VNF Record (VNFR).

5. The method of claim 2, wherein the method is executed in a Network Functions Virtualization (NFV) system, running in a cloud computing environment, comprising a NFV Orchestrator (NFVO) operative for on-boarding vendor-provided VNFDs in the VNF catalogue, an Operations Support Systems and Business Support Systems (OSS/BSS) operative for configuring the parameters of the on-boarded VNFDs, and a Virtual Network Function (VNF) Manager (VNFM) operative for instantiating VNFs based on on-boarded VNFDs.

6. The method of claim 2, wherein the tailored VNFD further comprises VNF identification data, VNFC data, and virtualized resource requirements.

7. The method of claim 6, wherein VNF identification data comprises an identifier (ID), a vendor, and a version.

8. The method of claim 6, wherein VNFC data comprises specific VNFC configuration data and deployment constraints.

9. The method of claim 2, wherein the values of the information elements are default values.

10. The method of claim 2, wherein configuring parameters further comprises updating the tailored VNFD with deployment constraints and virtualized network resource requirements.

11. The method of claim 2, further comprising creating a VNF Record (VNFR).

12. The method of claim 11, wherein the VNFM is further operative for updating the VNFR with further configuration information.

13. The method of claim 1, wherein the method is executed in a Network Functions Virtualization (NFV) system, running in a cloud computing environment, comprising a NFV Orchestrator (NFVO) operative for on-boarding NSDs in the NS catalogue and for configuring the parameters of the selected on-boarded NSD.

14. The method of claim 13, wherein modifying information comprises providing values for information elements in the selected on-boarded NSD.

15. The method of claim 14, wherein the values are default values.

16. The method of claim 14, wherein the information comprises information related to constraints or policies of the NFV system.

17. The method of claim 1, further comprising adding Network Function Virtualization Infrastructure (NFVI) resources reserved for an NS instance of the NS, an NS status, and a logging capability for audit purpose to the NSR.

18. A system operative to design and provide a tailored Network Service (NS), and for deploying a corresponding NS, the system running in a cloud computing environment comprising computing hardware, the system comprising a NFV Orchestrator (NFVO), the system being operative to:
   select, using the computing hardware, an on-boarded NS Descriptor (NSD) from a NS catalogue;
   modify, using the computing hardware, NSD information of the selected on-boarded NSD, thereby obtaining a tailored NSD, wherein the tailored NSD comprises a tailored Virtualized Network Function descriptor (VNFD) and wherein the tailored VNFD comprises VNF-specific data comprising connectivity requirements, inter-dependencies of VNF components (VNFCs), and deployment flavors; and
   instantiate, using the computing hardware, the NS according to the tailored NSD, by creating and deploying a network service record (NSR).

* * * * *

UNITED STATES PATENT AND TRADEMARK OFFICE
CERTIFICATE OF CORRECTION

PATENT NO. : 11,316,758 B2
APPLICATION NO. : 15/569344
DATED : April 26, 2022
INVENTOR(S) : Mustafiz et al.

It is certified that error appears in the above-identified patent and that said Letters Patent is hereby corrected as shown below:

On the Title Page

On Page 2, in Item (56), under "OTHER PUBLICATIONS", in Column 2, Line 1, delete ""Newtork" and insert -- "Network --, therefor.

On Page 2, in Item (56), under "OTHER PUBLICATIONS", in Column 2, Line 5, delete "Basedii" and insert -- based --, therefor.

On Page 2, in Item (56), under "OTHER PUBLICATIONS", in Column 2, Line 19, delete "V11.1" and insert -- V1.1.1 --, therefor.

In the Specification

In Column 1, Line 8, delete "62/376561," and insert -- 62/376,561, --, therefor.

In Column 6, Line 22, delete "focus put" and insert -- focus is put --, therefor.

In Column 8, Line 4, delete "VIM 104" and insert -- VIM 105 --, therefor.

In Column 12, Line 49, delete "request the" and insert -- request to the --, therefor.

Signed and Sealed this
Eleventh Day of October, 2022

Katherine Kelly Vidal
*Director of the United States Patent and Trademark Office*